United States Patent
Takeuchi et al.

(10) Patent No.: US 12,172,183 B2
(45) Date of Patent: Dec. 24, 2024

(54) CORROSION PREVENTION METHOD AND CORROSION PREVENTION DEVICE

(71) Applicant: Nippon Telegraph and Telephone Corporation, Tokyo (JP)

(72) Inventors: Yosuke Takeuchi, Musashino (JP); Ryuta Ishii, Musashino (JP); Shota Oki, Musashino (JP); Takuya Kamisho, Musashino (JP); Masayuki Tsuda, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 629 days.

(21) Appl. No.: 17/431,567

(22) PCT Filed: Feb. 6, 2020

(86) PCT No.: PCT/JP2020/004447
§ 371 (c)(1),
(2) Date: Aug. 17, 2021

(87) PCT Pub. No.: WO2020/170828
PCT Pub. Date: Aug. 27, 2020

(65) Prior Publication Data
US 2022/0134374 A1    May 5, 2022

(30) Foreign Application Priority Data
Feb. 20, 2019 (JP) .................................. 2019-028058

(51) Int. Cl.
*E04G 23/02* (2006.01)
*B05C 3/02* (2006.01)
(Continued)

(52) U.S. Cl.
CPC ............... *B05C 3/02* (2013.01); *B05D 1/18* (2013.01); *C04B 14/48* (2013.01); *C04B 41/009* (2013.01);
(Continued)

(58) Field of Classification Search
CPC ........................... E04G 23/02; E04C 5/015
(Continued)

(56) References Cited

U.S. PATENT DOCUMENTS

| | | | |
|---|---|---|---|
| 4,582,889 A * | 4/1986 | Yamaguchi | C09D 175/04 528/73 |
| 5,039,556 A * | 8/1991 | Cogliano | C04B 41/70 427/136 |

(Continued)

FOREIGN PATENT DOCUMENTS

| | | | | |
|---|---|---|---|---|
| DE | 3837794 A | * | 6/1989 | ............... C09D 5/08 |
| JP | H09-37937 A | | 3/1997 | |

(Continued)

OTHER PUBLICATIONS

DE3837794 translation (Year: 1989).*
(Continued)

*Primary Examiner* — Cachet I Proctor
(74) *Attorney, Agent, or Firm* — Workman Nydegger (57) ABSTRACT

To repair reinforced concrete easily and at low cost. An anticorrosion method includes infiltrating an anticorrosion solution held inside concrete of reinforced concrete into a vicinity of a reinforcing bar through the concrete to passivate the reinforcing bar, detecting that the anticorrosion solution is infiltrated to a surface of the concrete, and discharging, after detecting the anticorrosion solution, the anticorrosion solution to outside of the concrete to form an anticorrosive coating on a surface of the reinforcing bar.

19 Claims, 6 Drawing Sheets

(51) Int. Cl.
  *B05D 1/18* (2006.01)
  *C04B 14/48* (2006.01)
  *C04B 41/00* (2006.01)
  *C04B 41/45* (2006.01)
  *C04B 41/65* (2006.01)
  *C09D 5/08* (2006.01)
  *E04C 5/01* (2006.01)
  *G01N 17/00* (2006.01)

(52) U.S. Cl.
  CPC .......... *C04B 41/4535* (2013.01); *C04B 41/65* (2013.01); *C09D 5/084* (2013.01); *E04G 23/02* (2013.01); *G01N 17/00* (2013.01)

(58) Field of Classification Search
  USPC ........................................................ 427/7, 8
  See application file for complete search history.

(56) References Cited

U.S. PATENT DOCUMENTS

2006/0261505 A1* 11/2006 Bissonnette ........ C04B 41/4884
  264/129
2017/0044379 A1* 2/2017 Peterson .................. E04C 5/015

FOREIGN PATENT DOCUMENTS

| JP | 3056298 U | * 11/1998 | ............ B32B 27/06 |
| JP | 11193638 A | * 7/1999 | |
| JP | 2007-2585 A | 1/2007 | |
| JP | 2010-189871 A | 9/2010 | |
| JP | 4616419 B1 | * 1/2011 | |
| JP | 2011153497 A | * 8/2011 | |

OTHER PUBLICATIONS

JP4616419 translation (Year: 2011).*
JPH11193638 translation (Year: 2011).*
Nobuyoshi Hara, *Fundamentals of Corrosion of Metals*, Journal of the Vacuum Society of Japan, vol. 44, No. 10, 2001, pp. 860-867.
Takao Handa et al., *Hydrogen Delayed Fracture of Steel in Concrete*, IEICE Technical Report, vol. 109, No. 346, 2009, pp. 7-10.
Takao Ueda et al., *Deterioration of Concrete Structures and Some Relevant Issues*, Materials and Environment, vol. 59, No. 4, 2010, pp. 111-116.
Hirotake Endo, *Current Status and Issues of Deterioration Control Measures by the Surface Impregnation Method*, Concrete Engineering, vol. 48, No. 5, 2010, pp. 97-100.
Kachi Yamanobe et al., *Effect of Different Surface Impregnating Materials on Concrete Durability*, 39th Civil Engineering Society Kanto Branch Technical Research Presentation, Mar. 13, 2012, pp. 1-4.
*Standard Test Method for Corrosion Potentials of Uncoated Reinforcing Steel in Concrete*, Designation: C876-15, vol. 03.02, Annual book of ASTM Standards, ASTM International, vol. 30.02, 2018, pp. 1-8.

* cited by examiner

CORROSION PREVENTION METHOD AND CORROSION PREVENTION DEVICE

TECHNICAL FIELD

The present invention relates to an anticorrosion method and an anticorrosion device for reinforced concrete.

BACKGROUND ART

Reinforcing bars inside reinforced concrete are passivated because the concrete is alkaline, and the soundness of the reinforcing bars is maintained as long as the concrete is sound (Non Patent Literature 1).

However, if the concrete is neutralized, the reinforcing bars can corrode. In particular, when the concrete is cracked, the neutralization of the concrete progresses rapidly inside the cracked portion, and the reinforcing bars of the cracked portion is corroded at an early stage (Non Patent Literature 2).

Therefore, in a reinforced concrete structure, a sufficient cover thickness is required, and the cracked reinforced concrete is repaired by an electrochemical method (Non Patent Literature 3). The electrochemical method is a technique for desalting and repairing an existing concrete structure that has deteriorated using an electrochemical device to apply a large electric current for a short period of time.

CITATION LIST

NON PATENT LITERATURE

Non Patent Literature 1: Hara, "Fundamentals of Corrosion of Metals", J. Vac. soc., vol. 44_860

Non Patent Literature 2: Handa, "Hydrogen delayed fracture of steel in concrete", IEICE Technical Report, R2009-47, pp. 7-10 (2009)

Non Patent Literature 3: Ueda, "Deterioration of Concrete Structures and Some Relevant Issues", Materials and Environment, 59, pp. 111-116 (2010)

Non Patent Literature 4: Endo, "Current Status and Issues of Deterioration Control Measures by Surface Impregnation Method", Concrete Engineering, 48, pp. 97-100 (2010)

Non Patent Literature 5: Yamabe, "Influence of Difference in Application of Surface Impregnation Material Construction on Concrete Durability", 39th Japan Society of Civil Engineers Kanto Branch Technical Research Presentation, V-35

Non Patent Literature 6 "Standard Test Method for Corrosion Potentials of Uncoated Reinforcing Steel in Concrete", ASTM C 876-15, Annual book of ASTM Standards, vol. 03. 02,

SUMMARY OF THE INVENTION

Technical Problem

In order to re-alkalize highly neutralized reinforced concrete by an electrochemical method, electrical connection to the reinforcing bars is necessary, so construction that involves destruction, such as scraping some concrete and exposing the reinforcing bars, is required.

Further, although destruction is not required in the anticorrosion method using a surface impregnation material, the effect on the existing structure is unknown (Non Patent Literatures 4 and 5).

The present invention has been made in view of the above problems, and an object of the present invention is to repair reinforced concrete easily and at low cost without using a special machine such as an electrochemical device.

Means for Solving the Problem

In order to achieve the above object, an aspect of the present invention is an anticorrosion method for suppressing corrosion of a reinforcing bar in reinforced concrete, the method including infiltrating an anticorrosion solution held inside concrete of the reinforced concrete into a vicinity of the reinforcing bar through the concrete to passivate the reinforcing bar, detecting that the anticorrosion solution is infiltrated to a surface of the concrete, and discharging, after detecting the anticorrosion solution, the anticorrosion solution to outside of the concrete to form an anticorrosive coating on a surface of the reinforcing bar.

An aspect of the present invention is an anticorrosion device configured to suppress corrosion of a reinforcing bar in reinforced concrete, including a storage unit formed inside concrete of the reinforced concrete and configured to hold an anticorrosion solution, a detection unit configured to detect that the anticorrosion solution is infiltrated to a surface of the concrete, and a drainage unit configured to discharge, after detection of the anticorrosion solution by the detection unit, the anticorrosion solution from the storage unit, in which the anticorrosion solution includes a solution that infiltrates into a vicinity of the reinforcing bar through the concrete to passivate the reinforcing bar and forms an anticorrosive coating on a surface of the reinforcing bar.

An aspect of the present invention is an anticorrosion device configured to suppress corrosion of a reinforcing bar in reinforced concrete, including a storage unit formed inside concrete of the reinforced concrete and configured to hold an anticorrosion solution, and a drainage unit configured to discharge the anticorrosion solution from the storage unit, in which the anticorrosion solution includes a solution that infiltrates into a vicinity of the reinforcing bar through the concrete to passivate the reinforcing bar and forms an anticorrosive coating on a surface of the reinforcing bar, and the drainage unit is formed of an identical concrete as the concrete, and thickness of the drainage unit is not less than thickness of concrete between the storage unit and the reinforcing bar, and less than thickness between the storage unit, through the reinforcing bar, and the surface of the concrete.

Effects of the Invention

According to the present invention, reinforced concrete can be repaired easily and at low cost.

DESCRIPTION OF EMBODIMENTS

Hereinafter, an embodiment of the present invention will be described with reference to the drawings.

In reinforced concrete, in addition to the role of the internal reinforcing bars to increase the strength of the concrete, alkaline concrete covers the reinforcing bars to prevent corrosion of the reinforcing bars. Reinforcing bars in sound reinforced concrete without cracks are passivated because they are covered by the alkaline environment of the concrete. However, in the cracked reinforced concrete, the neutralization of the inside of the concrete in the cracked portion progresses, and the reinforcing bars are depassivated and corrosion progresses.

The present embodiment is a technique for preventing corrosion of reinforcing bars in reinforced concrete with advanced neutralization, such as a cracked reinforced concrete structure, without construction with destruction of reinforced concrete.

When cracks occur in concrete, the inside of the cracks is neutralized, and the reinforcing bars are corroded when neutral to acidic moisture invades them. However, even when the inside of the crack is neutralized, it is possible to prevent corrosion by retaining an alkaline solution in the vicinity of the reinforcing bars.

Moreover, because the depth (progress) of neutralization of concrete is in units of several mm in one year, many unneutralized regions remain in concrete. Therefore, even if neutral to acidic moisture such as rainwater invades the inside of the crack, when this moisture is retained, calcium hydroxide in the concrete in the unneutralized region is dissolved in the retained moisture and diffuses through the concrete, so that the vicinity of the reinforcing bars changes to an alkaline environment.

Therefore, if it is possible to supply alkaline to neutral moisture to reinforced concrete and retain alkaline moisture in the vicinity of the reinforcing bars, corrosion of the reinforcing bars can be prevented.

Figure 1:
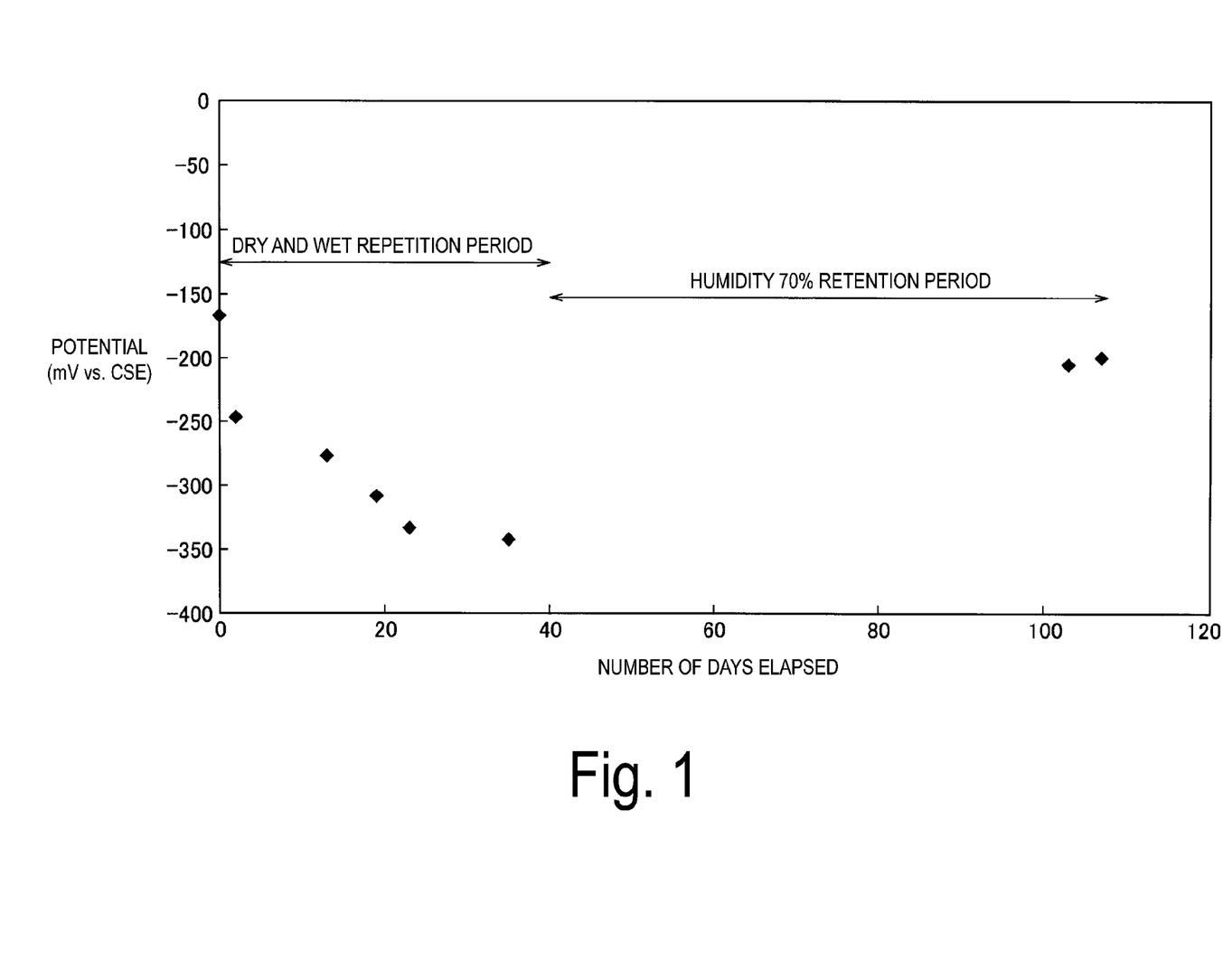
FIG. 1 is a diagram showing a result of potential measurement.

FIG. 1 shows the results of potential measurement. FIG. 1 shows the result of potential measurement, in which a reinforced concrete specimen with 0.1 mm wide cracks was subjected to a dry and wet repetition test that repeats a cycle of a wet process by soaking in moisture for 7 hours and a drying process by a constant temperature chamber equipment (maintaining 60° C.) for 41 hours, and then left in an environment with a humidity of about 70%. In FIG. 1, the potential is shown to be less noble during the period (0 to 40 days) when the dry and wet repetition test is continued, and the potential is shown to be noble during the period (100 days to) when the test is left in an environment with a humidity of about 70%. There is no measurement data for the period of 40 to 100 days, but it is believed that the potential gradually rises from −350 mV to −200 mV.

According to APPENDIX X1.1.3 of Non Patent Literature 6, when the potential of a certain region is more negative than −350 mV vs. CSE, it is determined that the reinforcing bars in that region are corroded with a probability of 90% or more. From this, it can be assumed that corrosion is progressing due to repeated drying and wetting. On the other hand, the nobility of the potential indicates the stop of corrosion, which is considered to be the result of moisture staying inside the cracks when left in an environment with a humidity of 70%, and it is shown that the moisture retention has an anticorrosion effect.

When the retained moisture is alkalized and then evaporated, an anticorrosive coating containing solutes in the moisture is formed.

Figure 2:
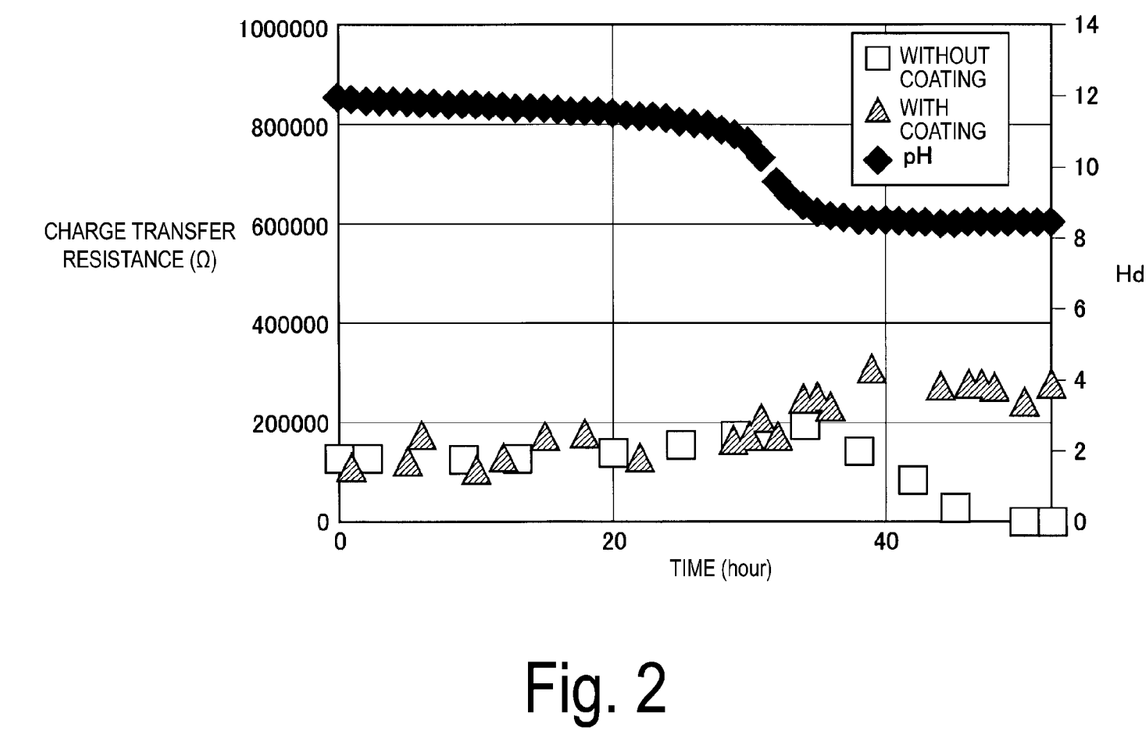
FIG. 2 is a diagram illustrating a time change of pH and a time change of charge transfer resistance value with and without anticorrosive coating.

FIG. 2 illustrates the change in charge transfer resistance when a steel material with anticorrosive coating (with coating) and a steel material without anticorrosive coating (without coating) are soaked in an alkaline solution which is an alkaline environment and then the environment is neutralized. SS400 was used for both steel materials. When there is no anticorrosive coating, the charge transfer resistance begins to decrease when the pH drops to about 10. Since a decrease in charge transfer resistance means that corrosion progresses, it can be assumed that corrosion has progressed with the neutralization of the environment. On the other hand, the pH of the steel material having an anticorrosive coating decreased to about 10, and the charge transfer resistance did not decrease even if the neutralization of the environment progressed. Therefore, it is evident that the anticorrosive coating can prevent corrosion of the steel material, and the formation of the anticorrosive coating can prevent corrosion of the reinforcing bars inside the cracks in the concrete.

As described above, the moisture is alkalized inside the concrete, and an anticorrosive coating is formed in the process of removing the alkaline moisture. Therefore, after the reinforcing bars are passivated by supplying moisture to the vicinity of the reinforcing bars, the anticorrosive coating can remain formed even if the moisture is removed.

Note that, the anticorrosion effect can be obtained by supplying moisture to the concrete, but on the other hand, because the remaining moisture expands by volume when frozen in winter, stress load is applied to the concrete structure and the concrete structure may be destroyed. Therefore, it is desirable to remove the retained moisture in a low temperature environment where freezing occurs after the re-passivation has progressed sufficiently.

Figure 3:
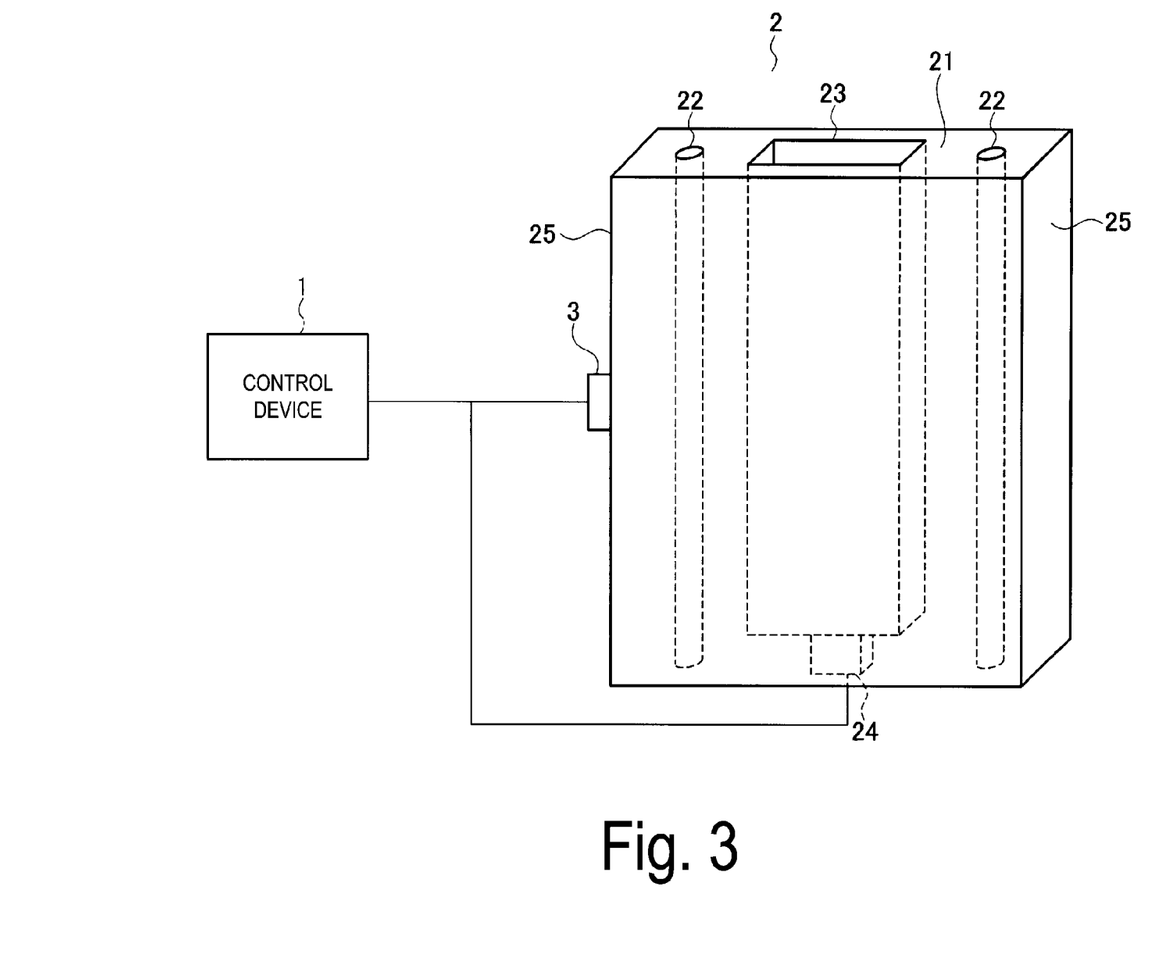
FIG. 3 is a diagram illustrating an overall configuration of an anticorrosion device according to an embodiment of the present invention.

FIG. 3 illustrates a configuration of an anticorrosion device (system) of the present embodiment. The anticorrosion device suppresses corrosion of the reinforcing bars inside the reinforced concrete by supplying moisture to the vicinity of the reinforcing bars of the reinforced concrete and removing the moisture after the moisture supply is verified. That is, the anticorrosion solution is stored in the solution storage unit surrounded by concrete, and the anticorrosion solution infiltrates into the concrete by diffusion. When it is detected that the anticorrosion solution reaches the position of the reinforcing bars and further reaches the outer surface of the concrete, the stored anticorrosion solution is discharged in order to prevent the concrete from being destroyed by freezing and expansion of the anticorrosion solution.

The anticorrosion device of the present embodiment comprises a control device 1 (control unit), a solution storage unit 23, a drainage unit 24, and a moisture detection unit 3.

In the reinforced concrete structure 2, a plurality of reinforcing bars 22 are arranged inside the concrete 21. In the present embodiment, a solution storage unit 23 for holding (storing) the anticorrosion solution is formed inside the concrete 21. The solution storage unit 23 is a space surrounded by concrete 21 and is an area in which an anticorrosion solution is stored. It is assumed that the solution storage unit 23 is previously formed in the reinforced concrete structure 2 in the shape of a product. Further, the solution storage unit 23 may be formed later in the concrete 21 portion of the reinforced concrete structure 2.

The anticorrosion solution infiltrates and diffuses into the vicinity of the reinforcing bars 22 through the concrete 21 to passivate the reinforcing bars 22 by alkalizing the concrete 21 in the vicinity of the reinforcing bars 22, and form an anticorrosive coating on the surface of the reinforcing bars 22 due to the deposition of solutes in the anticorrosion solution.

The anticorrosion solution may be stored in the solution storage unit 23 in advance. Alternatively, the anticorrosion solution may be supplied to the solution storage unit 23 at a predetermined timing such as when a crack (fissure) that causes corrosion of the reinforcing bars 22 occurs on the surface 25 of the reinforced concrete structure 2. The surface 25 is an outer surface (exposed surface) where the concrete 21 of the reinforced concrete structure 2 is in contact with the outside.

Further, the reinforced concrete structure 2 comprises a drainage unit 24 (drainage mechanism) for draining the anticorrosion solution stored in the solution storage unit 23. After the moisture detection unit 3 detects that the anticorrosion solution has infiltrated to the surface 25 of the reinforced concrete structure 2, the drainage unit 24 discharges the anticorrosion solution from the solution storage unit 23 to the outside of the reinforced concrete structure 2 (for example, underground). The drainage unit 24 is, for example, a drainage valve that opens and closes in response to a control signal from the control device 1, or a drainage pump that operates in response to the control signal.

The moisture detection unit 3 (moisture sensor) detects that the anticorrosion solution has infiltrated to the surface 25 of the concrete. In the present embodiment, the moisture detection unit 3 is installed on the surface 25 of the concrete structure 2 and measures the moisture value of the surface 25 of the reinforced concrete structure 2. Then, when the moisture value of the surface 25 of the reinforced concrete structure 2 exceeds a predetermined value, the moisture detection unit 3 detects that the anticorrosion solution has infiltrated to the surface 25 of the concrete, and transmits a detection signal to the control device 1.

The control device 1 is connected to the drainage unit 24 and the moisture detection unit 3 electrically, physically, or via a network. The control device 1 may be, for example, a computer such as a personal computer.

The control device 1 transmits a control signal to the drainage unit 24 to control and operate the drainage unit 24. When receiving the control signal from the control device 1, the drainage unit 24 discharges the anticorrosion solution stored in the solution storage unit 23 to the outside of the reinforced concrete structure 2.

Figure 4:
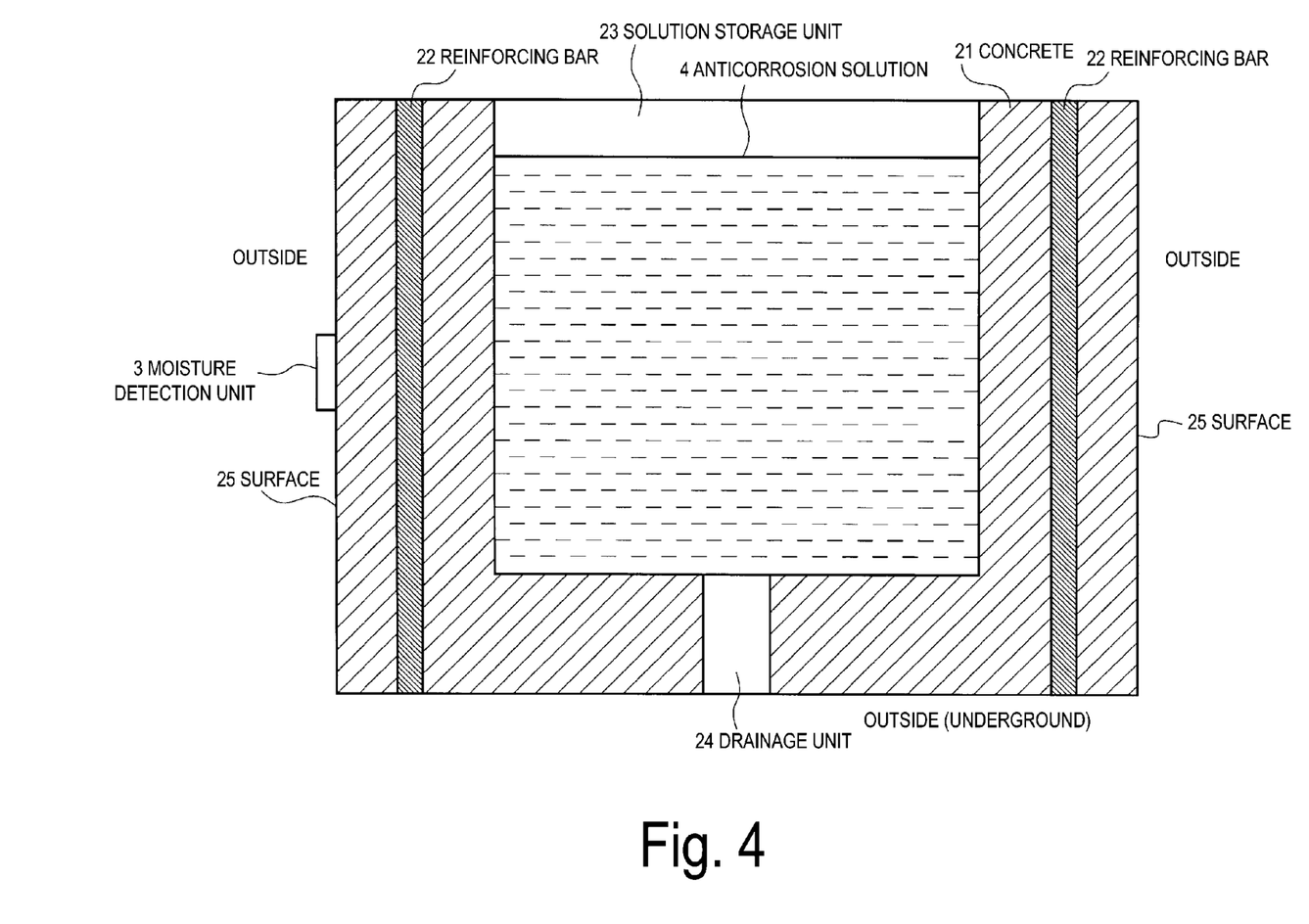
FIG. 4 is a cross-sectional view of a reinforced concrete structure according to an embodiment of the present invention.

FIG. 4 is a cross-sectional view of the reinforced concrete structure 2 illustrated in FIG. 3. In FIG. 4, the anticorrosion solution 4 is stored in the solution storage unit 23. The anticorrosion solution 4 has a pH value in the range of pH 7 to pH 12. That is, the anticorrosion solution 4 is an alkaline solution.

Further, the anticorrosion solution 4 may contain at least one of sodium hydrogen carbonate, potassium hydroxide, sodium hydroxide, or calcium hydroxide.

Further, the anticorrosion solution 4 may contain any one of sodium hydrogen carbonate, potassium hydroxide, sodium hydroxide, and calcium hydroxide as a main component. The main component means that the concentration is at least 0.1% or more.

Because the moisture of the anticorrosion solution 4 is alkalized by elution of calcium hydroxide from the unneutralized region of concrete, it is possible to use rainwater as a moisture supply source and eliminate the need to supply the anticorrosion solution 4. That is, the anticorrosion solution 4 may be a solution that uses rainwater as a solvent and is alkalized by elution of calcium hydroxide in the unneutralized region of the concrete 21 into the rainwater. In this case, the top of the solution storage unit 23 is opened, and rainwater is stored in the solution storage unit 23. For the concrete structure 2 with a remaining unneutralized region, when rainwater is used as a solvent and calcium hydroxide from the concrete 21 in the unneutralized region is eluted into the rainwater, the rainwater is alkalized and anticorrosion performance is exhibited. This eliminates the need to supply the anticorrosion solution 4 to the solution storage unit 23.

However, when using moisture at neutral or lower pH as the anticorrosion solution 4, it may accelerate the deterioration of concrete, so that it is desirable to use a neutral to alkaline anticorrosion solution 4 containing sodium hydrogen carbonate, potassium hydroxide, sodium hydroxide, calcium hydroxide, or the like as a main component.

The drainage unit 24 of the present embodiment may have, for example, an openable and closable drainage valve for discharging the anticorrosion solution 4 from the bottom of the solution storage unit 23. The drainage valve is closed and the anticorrosion solution 4 is not drained from the solution storage unit 23 until the moisture detection unit 3 detects that the anticorrosion solution 4 has infiltrated to the surface 25 of the reinforced concrete structure 2. On the other hand, when the moisture detection unit 3 detects that the anticorrosion solution 4 has infiltrated to the surface 25, in response to the control signal from the control device 1, the drainage valve is operated, the drainage valve is opened, and the anticorrosion solution 4 is discharged to the outside such as underground via the drainage unit 24.

Further, the drainage unit 24 may have a drainage pump for discharging the anticorrosion solution 4 from the solution storage unit 23. When the moisture detection unit 3 detects that the anticorrosion solution 4 has infiltrated to the surface 25, the drainage pump operates in response to the control signal from the control device 1, and the anticorrosion solution 4 is discharged to the outside such as underground via the drainage unit 24.

Next, the anticorrosion treatment of the present embodiment will be described.

Figure 5:
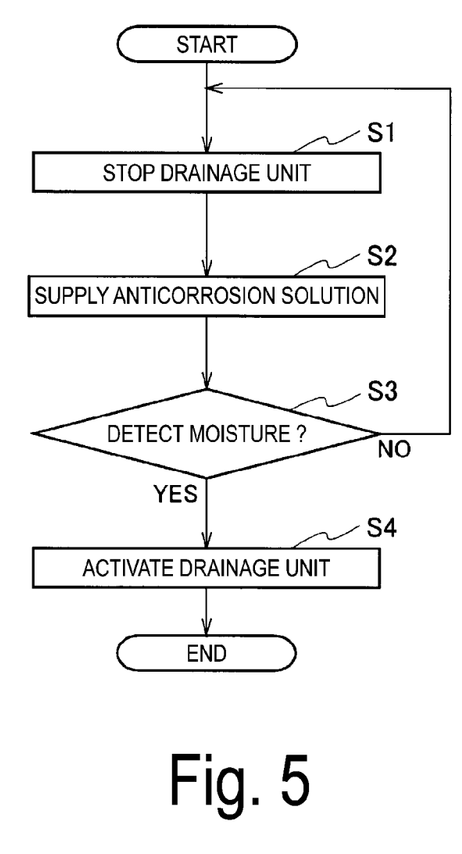
FIG. 5 is a flowchart illustrating an anticorrosion treatment.

FIG. 5 is a diagram illustrating an example of a processing flow of the anticorrosion treatment. First, the control device 1 stops the operation of the drainage unit 24 in order to store the anticorrosion solution 4 in the solution storage unit 23 (step S1). For example, the drainage valve of the drainage unit 24 is in a closed state, or the drainage pump of the drainage unit 24 is not operating.

The anticorrosion solution 4 is supplied to the solution storage unit 23 surrounded by the concrete 21 in a state where the drainage unit 24 is not operating (step S2). When rainwater is used as the solvent of the anticorrosion solution 4, wait for the rain to fall. The wetting step is started by supplying the anticorrosion solution 4 to the solution storage unit 23. In the wetting step, the anticorrosion solution 4 infiltrates and diffuses into the concrete 21 to infiltrate into the vicinity of the reinforcing bars 22 through the concrete 21, and the reinforcing bars 22 is passivated by alkalizing the concrete 21 in the vicinity of the reinforcing bars 22.

The moisture detection unit 3 determines whether the anticorrosion solution 4 has infiltrated to the surface 25 of the concrete 21 (step S3). When the moisture detection unit 3 detects the anticorrosion solution 4 on the surface 25 of the concrete 21 (step S3: YES), the moisture detection unit 3 transmits a detection signal to the control device 1. When the control device 1 receives the detection signal, the control device 1 transmits a control signal to the drainage unit 24 for draining.

The drainage unit 24 operates according to a control signal to drain the anticorrosion solution 4 of the solution storage unit 23 to the outside of the reinforced concrete structure 2 (step S4). When the anticorrosion solution 4 is drained, the concrete 21 is dried naturally and moisture is removed from the concrete 21. That is, when the discharging step (drying step) is started and the moisture is removed, the solute (for example, calcium hydroxide, calcium carbonate, and the like) in the anticorrosion solution 4 is deposited, whereby an anticorrosive coating is formed on the surface of the reinforcing bars 22.

As described above, in the present embodiment, the anticorrosion solution 4 is stored in the solution storage unit 23, and the anticorrosion solution 4 infiltrates into the vicinity of the reinforcing bars 22 via the concrete 21, so that the concrete 21 in the vicinity of the reinforcing bars 22 is alkalized and the surface of the reinforcing bars 22 is passivated. In the present embodiment, the anticorrosion solution 4 is discharged and the concrete 21 is dried naturally to form an anticorrosive coating on the reinforcing bars 22 due to the deposition of the solute in the anticorrosion solution 4. That is, by removing the moisture of the anticorrosion solution 4 impregnated into the concrete 21 and drying the concrete 21, the alkaline component of the anticorrosion solution 4 is neutralized to form an anticorrosive coating, and the anticorrosive coating is fixedly formed so as to cover the surface of the reinforcing bars 22. As a result, anticorrosion performance is exhibited. The anticorrosive coating is formed when the alkaline component of the anticorrosion solution 4 or the alkaline component leached from the concrete 21 due to impregnation with rainwater is neutralized by removing moisture.

When using the anticorrosion solution 4 containing calcium hydroxide, which is the main component of concrete, as the main component, in the wetting step, the neutralized concrete in the cracked portion is alkalized, and in the discharging step, an anticorrosive coating is formed by the deposition of calcium hydroxide and calcium carbonate. Calcium carbonate is deposited when calcium hydroxide comes into contact with and reacts with carbon dioxide in the air.

In the present embodiment, the moisture detection unit 3 installed on the surface of the reinforced concrete structure 2 detects the anticorrosion solution 4, and also the concrete 21 is dried by natural drying. Therefore, the state in which the concrete 21 is impregnated with the anticorrosion solution 4 can be maintained for a relatively long time.

Modifications

Next, a modification of the drainage unit 24 of the present embodiment will be described. The drainage unit 24 of the present embodiment illustrated in FIG. 3 is provided with a drainage mechanism such as a drainage valve or a drainage pump, which is different from the concrete 21. The drainage unit of the present modification drains the anticorrosion solution 4 to the outside by adjusting the thickness of a part of the concrete 21 surrounding the solution storage unit 23.

Figure 6:
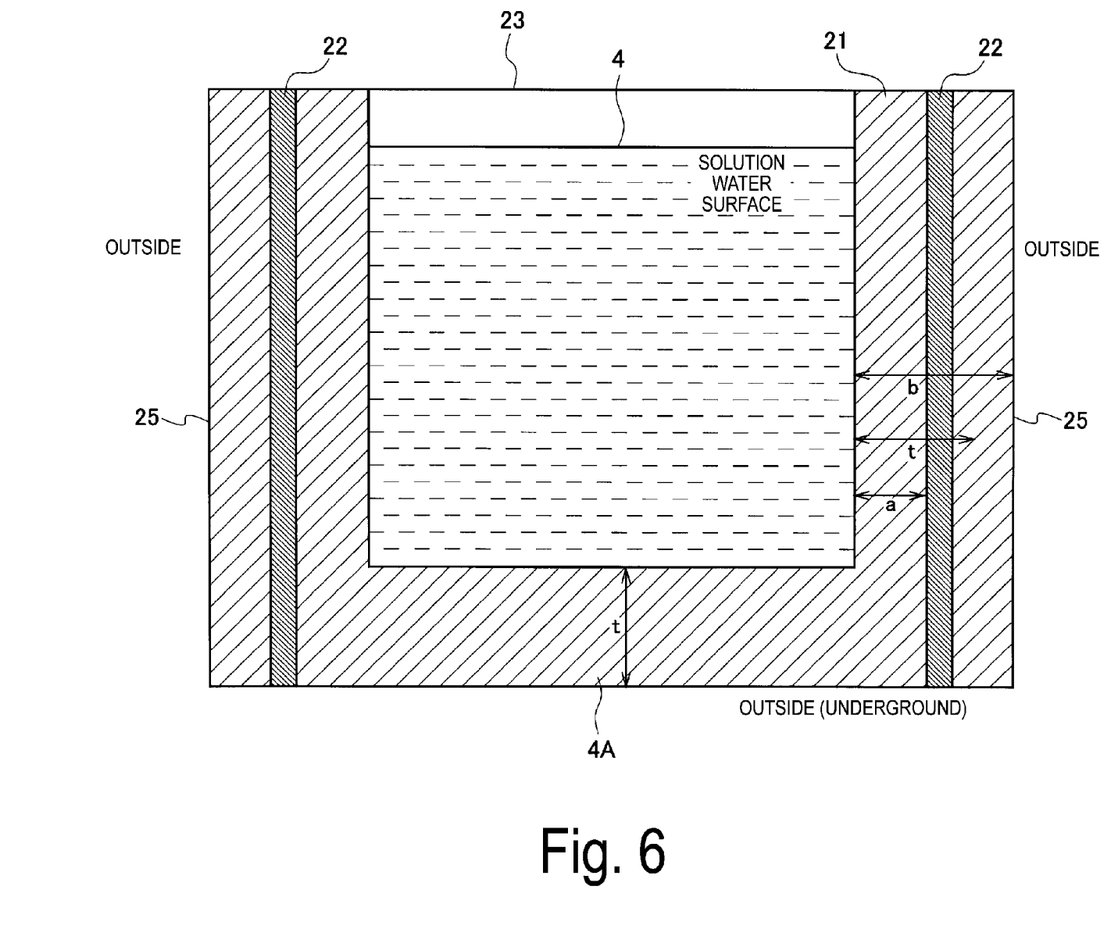
FIG. 6 is a cross-sectional view of a reinforced concrete structure of a modification.

FIG. 6 illustrates the drainage unit 24A of the present modification. In the present modification, instead of the drainage unit 24 illustrated in FIG. 4, the drainage unit 24A, which is the concrete of the same material as the concrete 21, is provided. In the present modification, the moisture detection unit 3 and the control device 1 are unnecessary. Others are the same as those of the embodiments illustrated in FIGS. 3 and 4.

In the present modification, by setting the thickness t of a part of the solution storage unit 23 to a thickness within the range of the following relationship, the anticorrosion solution 4 is automatically discharged from the solution storage unit 23.

$$a \leq t < b$$

As illustrated in FIG. 6, a is the thickness of the concrete 21 from the solution storage unit 23 to the reinforcing bars 22, and b is the thickness of the entire concrete 21. By setting the thickness t of the drainage unit 24A to a or more and making the drainage unit 24A the concrete having the same composition as the concrete 21 of the reinforced concrete structure 2, it is possible to hold the anticorrosion solution 4 in the solution storage unit 23 for at least the time required for the anticorrosion solution 4 to reach the reinforcing bars 22. The thickness of the drainage unit 24A is the thickness from the bottom of the solution storage unit 23 to the outside of the reinforced concrete structure 2 in the illustrated example.

That is, the drainage unit 24A of the present modification is formed of the same concrete as the concrete 21 of the reinforced concrete structure 2, the thickness t of the drainage unit 24A is not less than the thickness a of the concrete 21 between the solution storage unit 23 and the reinforcing bars 22, and is less than the thickness b to the surface 25 of the concrete 21 through the solution storage unit 23 and the reinforcing bars 22. In this way, by setting the thickness t of the drainage unit 24A not less than the thickness a, after the anticorrosion solution 4 reaches the reinforcing bars 22, the anticorrosion solution 4 diffuses and is discharged to the outside of the reinforced concrete structure 2.

The present embodiment and the modifications described above include infiltrating an anticorrosion solution 4 held inside the concrete 21 of the reinforced concrete into the vicinity of the reinforcing bars 22 through the concrete 21 to passivate the reinforcing bars 22, detecting that the anticorrosion solution 4 is infiltrated to the surface 25 of the concrete 21, and discharging, after detecting the anticorrosion solution 4, the anticorrosion solution 4 to the outside of the concrete 21 to form the anticorrosive coating on the surface of the reinforcing bars 22.

As a result, in the present embodiment, the corrosion of the reinforcing bars 22 inside the reinforced concrete is suppressed, and the reinforced concrete can be easily repaired at low cost. In related art, repairing cracks in reinforced concrete structures required large-scale equipment such as a concrete machine tool and electrochemical equipment, and required complicated processes such as removal of concrete. On the other hand, in the present embodiment, it is possible to give an anticorrosion effect to the reinforcing bars by a simple method of infiltrating the anticorrosion solution 4 into the concrete, discharging the anticorrosion solution 4 and allowing the concrete to dry naturally, to repair the reinforced concrete structure 2.

Therefore, in the present embodiment and the modification, it is possible to easily and inexpensively prevent corrosion and repair the reinforced concrete structure 2 without requiring the construction involving the exposure of the reinforcing bars 22 for the reinforced concrete structure 2 with minute cracks. In addition, the present embodiment is also a useful technique as a treatment when a crack is detected in an inspection work of a reinforced concrete structure.

In the present embodiment and the modification, the anticorrosion solution 4 is discharged from the solution storage unit 23 after the anticorrosion solution 4 is supplied to the vicinity of the reinforcing bars 22. As a result, the reinforcing bars 22 can be protected from corrosion, and the stress load on the reinforced concrete structure 2 due to the freezing and expansion of the anticorrosion solution 4 can be prevented.

As the control device 1 described above, for example, a general-purpose computer system including a central processing unit (CPU; processor), a memory, a storage (hard disk drive (HDD) or a solid state drive (SSD)), a communication device, an input device, and an output device can be used. In the computer system, the CPU executes a program for the control device 1 loaded on the memory, whereby each function of the control device 1 is implemented. The program for the control device 1 may be stored in a computer-readable recording medium such as an HDD, an SSD, a USB memory, a CD-ROM, a DVD-ROM, or an MO, or can be distributed through a network.

The present invention is not limited to the embodiment, and various modifications can be made within the scope of the gist of the present invention. In the above embodiment, the moisture detection unit 3 transmits the detection signal to the control device 1, and the control device 1 transmits the control signal to the drainage unit 24. Alternatively, the moisture detection unit 3 and the drainage unit 24 may be connected electrically, physically, or via a network, then the moisture detection unit 3 transmits the detection signal directly to the drainage unit 24 and the drainage unit 24 operates by receiving the detection signal. In this case, the control device 1 is unnecessary.

REFERENCE SIGNS LIST

1: Control device
2: Reinforced concrete structure
21: Concrete
22: Reinforcing bar
23: Solution storage unit
24, 24A: Drainage unit
25: Surface
3: Moisture detection unit

The invention claimed is:

1. An anticorrosion method for suppressing corrosion of a reinforcing bar in reinforced concrete, the method comprising:
   infiltrating an anticorrosion solution a vicinity of the reinforcing bar through the concrete to passivate the reinforcing bar, wherein the anticorrosion solution is held in a storage unit formed by the concrete and disposed inside the concrete;
   detecting that the anticorrosion solution is infiltrated to an outside surface of the concrete; and
   discharging, after detecting the anticorrosion solution, the anticorrosion solution remaining in the storage unit to outside of the concrete to form an anticorrosive coating on a surface of the reinforcing bar.

2. An anticorrosion device configured to suppress corrosion of a reinforcing bar in reinforced concrete, comprising:
   a storage unit formed inside concrete of the reinforced concrete and formed by the concrete, wherein the storage unit is configured to hold an anticorrosion solution;
   a detection unit configured to detect that the anticorrosion solution is infiltrated to an outside surface of the concrete; and
   a drainage unit configured to discharge, after detection of the anticorrosion solution by the detection unit, the anticorrosion solution remaining in the storage unit from the storage unit, wherein
   the anticorrosion solution includes a solution that infiltrates into a vicinity of the reinforcing bar through the concrete to passivate the reinforcing bar and forms an anticorrosive coating on a surface of the reinforcing bar.

3. The anticorrosion device according to claim 2, wherein the drainage unit includes a drainage valve configured to discharge the anticorrosion solution from the storage unit, and
the drainage valve operates when the detection unit detects the anticorrosion solution.

4. The anticorrosion device according to claim 3, wherein the anticorrosion solution includes a pH value in the range of pH 7 to pH 12.

5. The anticorrosion device according to claim 3, wherein the anticorrosion solution includes a solution that uses rainwater as a solvent and is alkalized by elution of calcium hydroxide in an unneutralized region of the concrete into the rainwater.

6. The anticorrosion device according to claim 3, wherein the anticorrosion solution comprises at least one of sodium hydrogen carbonate, potassium hydroxide, sodium hydroxide, or calcium hydroxide.

7. The anticorrosion device according to claim 2, wherein the drainage unit includes a drainage pump configured to discharge the anticorrosion solution from the storage unit, and
the drainage pump operates when the detection unit detects the anticorrosion solution.

8. The anticorrosion device according to claim 7, wherein the anticorrosion solution includes a pH value in the range of pH 7 to pH 12.

9. The anticorrosion device according to claim 7, wherein the anticorrosion solution includes a solution that uses rainwater as a solvent and is alkalized by elution of calcium hydroxide in an unneutralized region of the concrete into the rainwater.

10. The anticorrosion device according to claim 7, wherein the anticorrosion solution comprises at least one of sodium hydrogen carbonate, potassium hydroxide, sodium hydroxide, or calcium hydroxide.

11. The anticorrosion device according to claim 2, wherein the anticorrosion solution includes a pH value in the range of pH 7 to pH 12.

12. The anticorrosion device according to claim 11, wherein the anticorrosion solution includes a solution that uses rainwater as a solvent and is alkalized by elution of calcium hydroxide in an unneutralized region of the concrete into the rainwater.

13. The anticorrosion device according to claim 11, wherein the anticorrosion solution comprises at least one of sodium hydrogen carbonate, potassium hydroxide, sodium hydroxide, or calcium hydroxide.

14. The anticorrosion device according to claim 2, wherein the anticorrosion solution includes a solution that uses rainwater as a solvent and is alkalized by elution of calcium hydroxide in an unneutralized region of the concrete into the rainwater.

15. The anticorrosion device according to claim 2, wherein the anticorrosion solution comprises at least one of sodium hydrogen carbonate, potassium hydroxide, sodium hydroxide, or calcium hydroxide.

16. An anticorrosion device configured to suppress corrosion of a reinforcing bar in reinforced concrete, comprising:

a storage unit formed inside concrete of the reinforced concrete and formed by the concrete, storage unit is configured to hold an anticorrosion solution; and a drainage unit configured to discharge the anticorrosion solution from the storage unit, wherein the anticorrosion solution includes a solution that infiltrates into a vicinity of the reinforcing bar through the concrete to passivate the reinforcing bar and forms an anticorrosive coating on a surface of the reinforcing bar, and the drainage unit is formed of an identical concrete as the concrete, wherein a thickness of the drainage unit is not less than a thickness of the concrete between the storage unit and the reinforcing bar, and less than a thickness of the concrete between the storage unit, through the reinforcing bar, and an outside surface of the concrete.

17. The anticorrosion device according to claim 16, wherein the anticorrosion solution includes a pH value in the range of pH 7 to pH 12.

18. The anticorrosion device according to claim 16, wherein the anticorrosion solution includes a solution that uses rainwater as a solvent and is alkalized by elution of calcium hydroxide in an unneutralized region of the concrete into the rainwater.

19. The anticorrosion device according to claim 16, wherein the anticorrosion solution comprises at least one of sodium hydrogen carbonate, potassium hydroxide, sodium hydroxide, or calcium hydroxide.

* * * * *